Nov. 25, 1952 W. W. MAHER 2,619,064
FLUXING MECHANISM WITH MOVABLE FLUX APPLYING TANK
Filed Aug. 23, 1949 2 SHEETS—SHEET 1

INVENTOR.
WILLIAM W. MAHER
BY Charles H. Erne
Ivan D. Thornburgh
ATTORNEYS

Nov. 25, 1952 W. W. MAHER 2,619,064
FLUXING MECHANISM WITH MOVABLE FLUX APPLYING TANK
Filed Aug. 23, 1949 2 SHEETS—SHEET 2

INVENTOR.
WILLIAM W. MAHER
BY Charles H. Eine
Ivan D. Thornburgh
ATTORNEYS

Patented Nov. 25, 1952

2,619,064

UNITED STATES PATENT OFFICE 2,619,064

FLUXING MECHANISM WITH MOVABLE FLUX APPLYING TANK

William W. Maher, San Francisco, Calif., assignor to American Can Company, New York, N. Y., a corporation of New Jersey Application August 23, 1949, Serial No. 111,853

2 Claims. (Cl. 113—95)

The present invention relates to machines for soldering or otherwise adhesively securing fittings, such as nozzles, pouring spouts, handles, etc. to other articles such as cans or containers and has particular reference to improved mechanism for fluxing or otherwise preparing such fittings prior to their attachment to the articles.

This is a companion to my co-pending United States applications Serial No. 111,852, filed August 23, 1949, on Machine for Applying Uniting Materials to Articles and for Assembling Them Together, and Serial No. 111,854, filed August 23, 1949, on Liquid Adhesive Applying Mechanism with Piston Feed.

The invention more particularly contemplates the provision of an improved mechanism for applying liquid flux to sheet metal can nozzles preparatory to the nozzles being coated with a film of molten solder and assembled with sheet metal containers for sweating thereto although the invention is equally well adapted to applying other fluid material to other fittings or articles if desired.

An object of the invention is the provision of a fluxing mechanism wherein controlled predetermined quantities of flux may be applied to fittings under high speed rates of production.

Another object is the provision of such a mechanism wherein a quantity of the flux is segregated and maintained at a constant predetermined depth so as to insure application of the flux to a predetermined height on all fittings, nozzles, or other articles, by an immersion of the articles into the flux.

Numerous other objects and advantages of the invention will be apparent as it is better understood from the following description, which, taken in connection with the accompanying drawings, discloses a preferred embodiment thereof.

Referring to the drawings.

Figure 1:
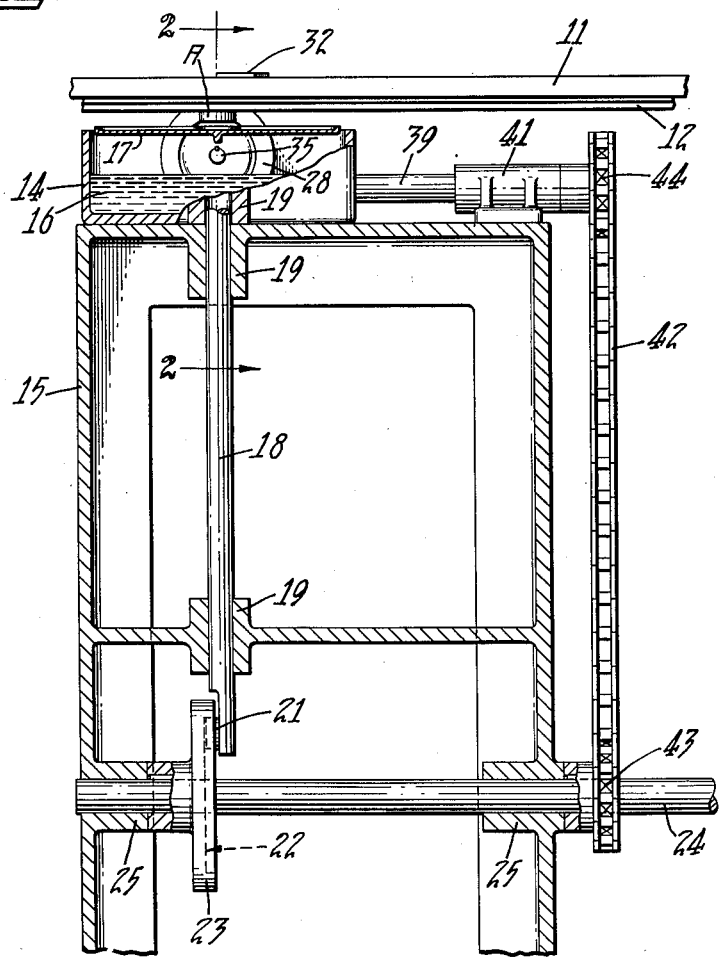
Figure 1 is a combination section and side elevation of a mechanism embodying the instant invention, with parts broken away.
Figure 2:
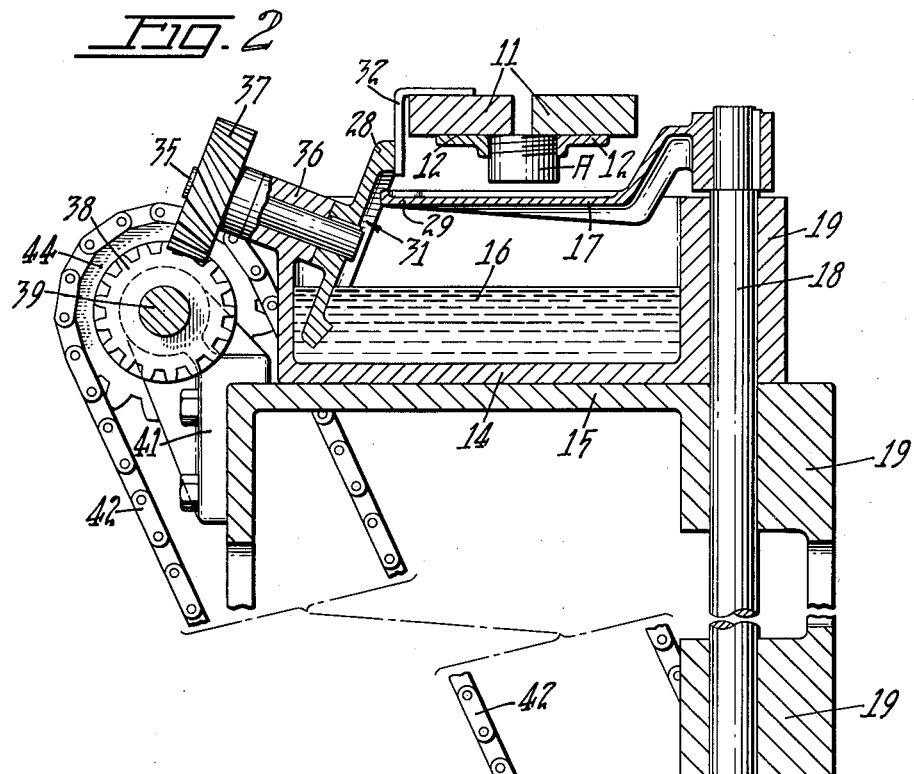
Fig. 2 is an enlarged sectional view taken substantially along the line 2—2 in Fig. 1, with parts broken away.

As a preferred or exemplary embodiment of the instant invention the drawings illustrate a mechanism for applying a film or coating of a liquid flux or fluxing material to sheet metal nozzles A preparatory to subsequently solder coating the nozzles and sweating them onto sheet metal containers to produce the well known pouring spout or nozzle type of container. In accordance with the instant invention this fluxing of the nozzles is effected by immersing the lower ends of the nozzles to a predetermined depth into a segregated bath of flux while the nozzles are held stationary in a suspended relation.

Any suitable device may be used for holding the nozzles in this position. For this purpose the drawings show a pair of spaced and parallel, horizontally disposed bar magnets 11, of either the permanent or electromagnet type and having a pair of spaced and parallel guide rails 12 secured to the lower faces thereof for locating the nozzles and for guiding them along a predetermined path of travel, as desired.

The fluxing mechanism comprises a flux tank 14 which is located under the bar magnets 11 and which is secured to a frame 15 which may be the main frame of a more elaborate machine. The tank 14 contains a bath 16 of the liquid fluxing material. The top of the tank is open. This flux tank is equipped with a vertically movable shallow tray 17 of a depth substantially equal to the height of the flux desired to be applied to the suspended nozzles A and is kept filled with flux from the tank.

The tray 17 is disposed horizontally adjacent the open top of the flux tank 14 and is mounted on the upper end of a vertical actuating rod 18, carried in slide bearings 19 formed in the tank and in the frame 15. The lower end of the actuating rod 18 carries a cam roller 21 which operates in a cam groove 22 of a face cam 23 secured to a rotatable shaft 24 journaled in bearings 25 formed in the frame 15. The shaft may be rotated in any suitable manner.

Thus through the rotation of the cam 23, the tray 17 is raised and lowered relative to the bar magnets 11. On its up stroke, the tray 17 is lifted high enough to meet and immerse the lower ends of a suspended nozzle A into the flux in the tray for substantially the full depth of the tray and hence since the tray is kept filled with flux the same predetermined amount of flux is applied to all of the nozzles suspended from the bar magnets 11.

Figure 3:
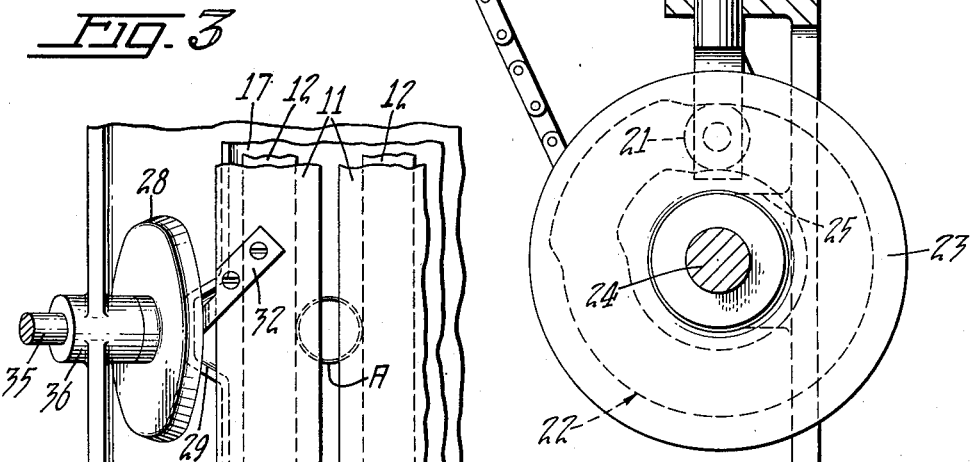
Fig. 3 is a fragmentary top plan view of certain of the parts shown in Fig. 2.

Maintenance of the predetermined amount of flux in the tray 17 is effected preferably by a rotatable lifter wheel 28 which rotates in the bath 16 of the flux in the tank 14. The wheel is disposed at an angle in the tank and leans toward and partially overhangs an extension 29 (Fig. 3) of the tray 17. The inner face of the wheel is formed with a concentric circular recess 31 providing an annular rim to facilitate this overhang and the edge of the wheel is beveled and engaged by a nonmagnetic scraper blade 32 which is secured to the adjacent bar magnet 11.

The lifter wheel 28 is mounted on the inner end of a short shaft 35 which is journaled for rotation in a bearing 36 formed in the flux tank 14. The outer end of the shaft, beyond the flux tank, carries a helical gear 37 which meshes with and is driven by a helical gear 38 mounted on and rotating with a gear shaft 39. The gear shaft 39 is journaled in a pair of spaced bearing brackets 41 secured to the top of and one side of the frame 15. The shaft is rotated by an endless chain 42 which operates over a driving sprocket 43 mounted on the shaft 24 and over a driven sprocket 44 mounted on the gear shaft 39.

In this manner of connection with the shaft 24, the lifter wheel 28 is rotated in the bath 16 of flux and carries up or lifts a film of the flux which is scraped off by the scraper blade 32 into the tray 17. Excess flux overflows the edges of the tray and falls back into the flux tank 14 and thus maintains the flux within the tray at a predetermined depth for deposit onto the nozzles A or any similar articles. It is of course understood that the described mechanism may be used with treating materials other than flux and with articles other than nozzles.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. Mechanism for applying liquid flux or similar material to articles, comprising a support for holding an article to be fluxed, a tank disposed beneath said supported article for containing a supply of liquid flux, a tray disposed between said tank and said support and constantly above the flux level in said tank for receiving and holding flux therein, a lifter wheel rotatably mounted adjacent said tray and having its lower peripheral portion immersed in the tank flux, the upper peripheral portion of said wheel overhanging said tray, means for rotating said wheel to carry the flux thereby from said tank to above said tray, a fixed blade disposed above said tray and engaging the overhanging peripheral portion of said lifter wheel for scraping flux therefrom and directing it into said tray to maintain the tray constantly filled to overflowing with flux, and means for imparting vertical movement to said filled tray above the flux level in said tank for applying flux from the tray to a predetermined portion of said article.

2. Mechanism for applying liquid flux or similar material to articles, comprising a support for holding articles to be fluxed, a tank disposed beneath a said supported article for containing a supply of liquid flux, a tray movably disposed between said tank and said support and constantly above the flux level in said tank for receiving and holding flux therein, said tray having a filling extension projecting laterally therefrom, a flux lifter wheel mounted for rotation in said tank adjacent said tray filling extension, said wheel having a laterally projecting annular rim immersed at its lower portion in the tank flux, the upper portion of said wheel rim overhanging said tray filling extension, means for rotating said wheel to carry the flux on the wheel rim from said tank to above said tray filling extension, a stationary blade disposed above the filling extension of the tray and in engagement with the overhanging rim of said lifter wheel for scraping the flux therefrom and directing it into said filling extension to maintain the tray constantly filled to overflowing with flux, and means for vertically reciprocating said filled tray while disposed at all times above the flux level in said tank for successively applying flux from the constantly filled tray to similar predetermined portions of said supported articles.

WILLIAM W. MAHER.

REFERENCES CITED

The following references are of record in the file of this patent:

UNITED STATES PATENTS

| Number | Name | Date |
|---|---|---|
| 1,103,067 | McColl | July 14, 1914 |
| 1,783,642 | Ferguson | Dec. 2, 1930 |
| 2,135,995 | Witzke | Nov. 8, 1938 |
| 2,313,751 | Hunter | Mar. 16, 1943 |